(12) United States Patent
Kato (10) Patent No.: US 8,007,390 B2
(45) Date of Patent: Aug. 30, 2011

(54) VEHICLE POWER TRANSMITTING DEVICE

(75) Inventor: Shingo Kato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 12/453,056

(22) Filed: Apr. 28, 2009

(65) Prior Publication Data

US 2009/0318255 A1  Dec. 24, 2009

(30) Foreign Application Priority Data

Jun. 20, 2008  (JP) .................................. 2008-162585

(51) Int. Cl.
  *F16H 57/04* (2010.01)
(52) U.S. Cl. ........................................... 475/160; 475/5
(58) Field of Classification Search ................ 475/5, 160
  See application file for complete search history.

(56) References Cited

U.S. PATENT DOCUMENTS

| | | | | |
|---|---|---|---|---|
| 4,799,564 A | * | 1/1989 | Iijima et al. | 310/63 |
| 6,329,731 B1 | * | 12/2001 | Arbanas et al. | 310/52 |
| 6,890,280 B2 | * | 5/2005 | Oshidari et al. | 475/159 |
| 2005/0211490 A1 | | 9/2005 | Shimizu et al. | |

FOREIGN PATENT DOCUMENTS

| | | |
|---|---|---|
| JP | U-07-016055 | 3/1995 |
| JP | A 9-53703 | 2/1997 |
| JP | A-2003-336725 | 11/2003 |
| JP | A-2005-253167 | 9/2005 |
| JP | A-2006-298314 | 11/2006 |
| JP | A-2008-132941 | 6/2008 |

OTHER PUBLICATIONS

Japanese Office Action issued in Japanese Patent Application No. 2008-162585 on Apr. 13, 2010 (with English translation).
Japanese Office Action issued in Japanese Application No. 2008-162585, dated Jan. 4, 2011 with English Translation.

* cited by examiner

*Primary Examiner* — David D Le
*Assistant Examiner* — Derek D Knight
(74) *Attorney, Agent, or Firm* — Oliff & Berridge, PLC (57) ABSTRACT

In a planetary gear unit 12 of a power transmitting device 10, a sun gear S1 is connected to an electric motor 20, a carrier CA1 is non-rotatably fixed to a case 40, and a ring gear R1 is connected to an output gear 13 and an oil pump 30. As a result, a structure of carrier being fixed/output power being taken out via ring gear is obtained. Therefore, for example, a structure can be employed in which the ring gear and the output gear are integrated. Accordingly, as compared with a structure in which a ring gear is fixed/output power is taken out via carrier and the output gear has to be axially offset and connected to a carrier, an axial space can be omitted, to allow the power transmitting device to be downsized.

5 Claims, 5 Drawing Sheets

FIG.6
PRIOR ART

VEHICLE POWER TRANSMITTING DEVICE

This application is based on Japanese Patent Application No. 2008-162585 filed on Jun. 20, 2008, and content thereof is incorporated herein for reference.

BACKGROUND OF THE INVENTION

1. Field of the Invention

The present invention relates to a vehicle power transmitting device, and it also relates to a technique of transmitting power through a planetary gear unit.

2. Description of the Related Art

Figure 6:
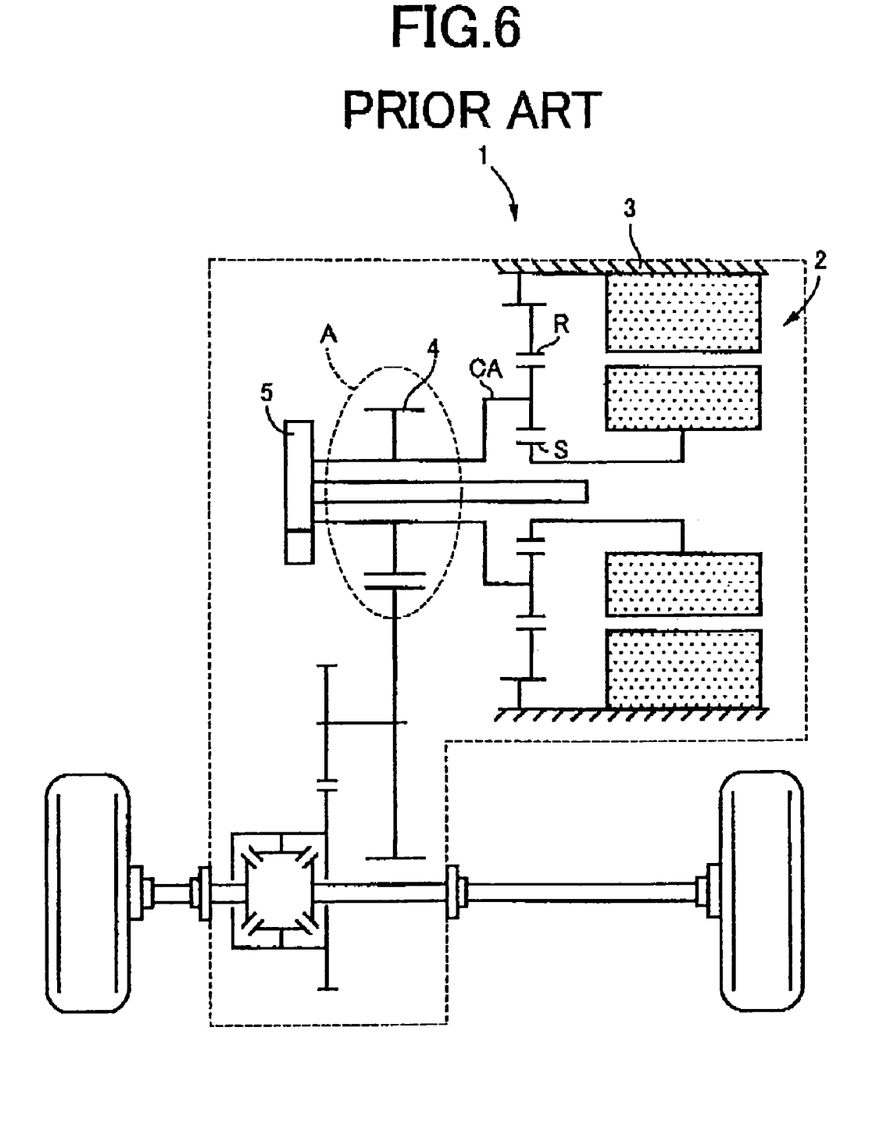
FIG. 6 is a schematic configuration diagram explaining the power train of a conventional electric vehicle.

A vehicle power transmitting device for transmitting power from a power source through a planetary gear unit to an output side are well known. For example, Patent Document 1 (JP-A-09-53703) discloses a power train for an electric vehicle as shown in FIG. 6, wherein, in an planet gear portion 1, an electric motor 2 is connected to a sun gear S, a ring gear R is fixed to a case 3, and a carrier CA is connected to both an output gear portion 4 and an oil pump 5. Accordingly, the planet gear portion 1 function as a reduction mechanism to drive the oil pump 5 at a lower rotational speed than the electric motor 2, thereby preventing a degradation of the oil pump that is driven by the electric motor and increasing its durability.

However, according to a carrier-output structure in which the output power is taken out via the carrier as disclosed in Patent Document 1, the planet gear portion 1 and the output gear portion 4 can not be connected, unless 4 they are offset in the axial direction of the planet gear portion 1, as indicated by the dashed line A. This requires a corresponding axial space, and there is a possibility that the power train itself may be upsized axially.

Further, in general, because arranging the oil pump 5 coaxial with the planet gear portion 1 is advantageous for lubricating the planet gear portion 1, the structure is employed in which the planet gear portion 1 and the oil pump 5 are positioned coaxial with each other as shown in FIG. 6. However, according to such a structure, as obvious from FIG. 6, there is a possibility that the power train itself may be further upsized axially. Noted that this problem is heretofore unknown.

SUMMARY OF THE INVENTION

The present invention is accomplished in view of the above background, and has an object is to provide a vehicle power transmitting device that can be downsized axially by achieving space saving axially.

For achieving the above object, the present invention relates to a vehicle power transmitting device for transmitting power from a power source through a planetary gear unit to an output side. The planetary gear unit comprises a sun gear that is connected to the power source, a carrier that is non-rotatably fixed, and a ring gear that is connected to an output rotary member, and serving as a reduction mechanism that, with reducing a rotational speed of the power source, transmits a rotation to the output rotary member. An oil pump is connected to the ring gear.

As a result, since the structure of the carrier being fixed/the output power being taken out from a ring gear is provided in the planetary gear unit, for example, a structure can be employed in which the ring gear and a part of output rotary member are integrated. Accordingly, as compared with a structure in which a ring gear is fixed/output power is taken out from carrier and an output rotary member has to be axially offset and connected to a carrier, the axial space can be omitted, to thereby downsize the power transmitting device. Thus, the axial space saving is achieved, that is the space can be axially saved, so that the vehicle power transmitting device can be downsized axially. Further, since the rotational speed of the oil pump connected to the output side is reduced relative to the rotational speed of the power source of the input side, the operating rotational speed of the oil pump can be suppressed to thereby increase a durability of the oil pump.

Preferably, the oil pump is disposed coaxial with the planetary gear unit and at least a part of the structural element of the oil pump is placed on an inner periphery side of an integral rotary member that rotates integrally with the ring gear. As a result, when positioning the oil pump coaxial with the planetary gear unit; with disposing the oil pump on the inner periphery side of the ring gear, the total length of the power transmitting device itself is reduced. Thus, because the oil pump is nested in the ring gear, further axial space saving is achieved.

Preferably, the integral rotary member is a cylindrical member equipped with an outer tooth that engages with a driven gear of a counter axis to output a power to driving wheels, for functioning as the output rotary member. As a result, the axial dimension of the power transmitting device can be reliably reduced.

Preferably, the vehicle power transmitting device further comprises an oil-path that is provided along the axis from the oil pump for ejecting a lubricating oil for lubricating the planetary gear unit from a rotational center of the planetary gear unit. As a result, the planetary gear unit is lubricated (cooled) by splashing the oil centrifugally from the axis side of the planetary gear unit, which advantageously prevents burning of the planetary gear unit. Further, the oil-path length can be advantageously reduced.

Preferably, the power source is an electric motor positioned coaxial with the planetary gear unit together with the oil pump, and the oil-path ejects a lubricating oil for cooling the electric motor, from the rotational center of the electric motor. As a result, the electric motor is advantageously cooled by circulating the oil for cooling from the axis side of the electric motor. Further, the oil-path length can be advantageously reduced. Further, since the planetary gear unit reduces the rotational speed of the oil pump relative to the rotational speed of the electric motor, the maximum rotational speed of the electric motor can be increased, which contributes to the downsizing of the electric motor.

Preferably, the vehicle power transmitting device is a power transmitting device for an electric vehicle whose power source is an electric motor. As a result, the electric vehicle whose power source is an electric motor, that is the electric vehicle that has the electric motor as the power source, can be appropriately constituted.

Preferably, the power transmitting device will be applied to, for example, a front-wheel- or a rear-wheel-drive vehicle where the power transmitting device is used as an independent drive unit (2WD), a four-wheel-drive car where the power transmitting device is used as a rear-side drive unit separately from the front-side drive unit (4WD), or the like.

DETAILED DESCRIPTION OF THE PREFERRED EMBODIMENTS

Figure 1:
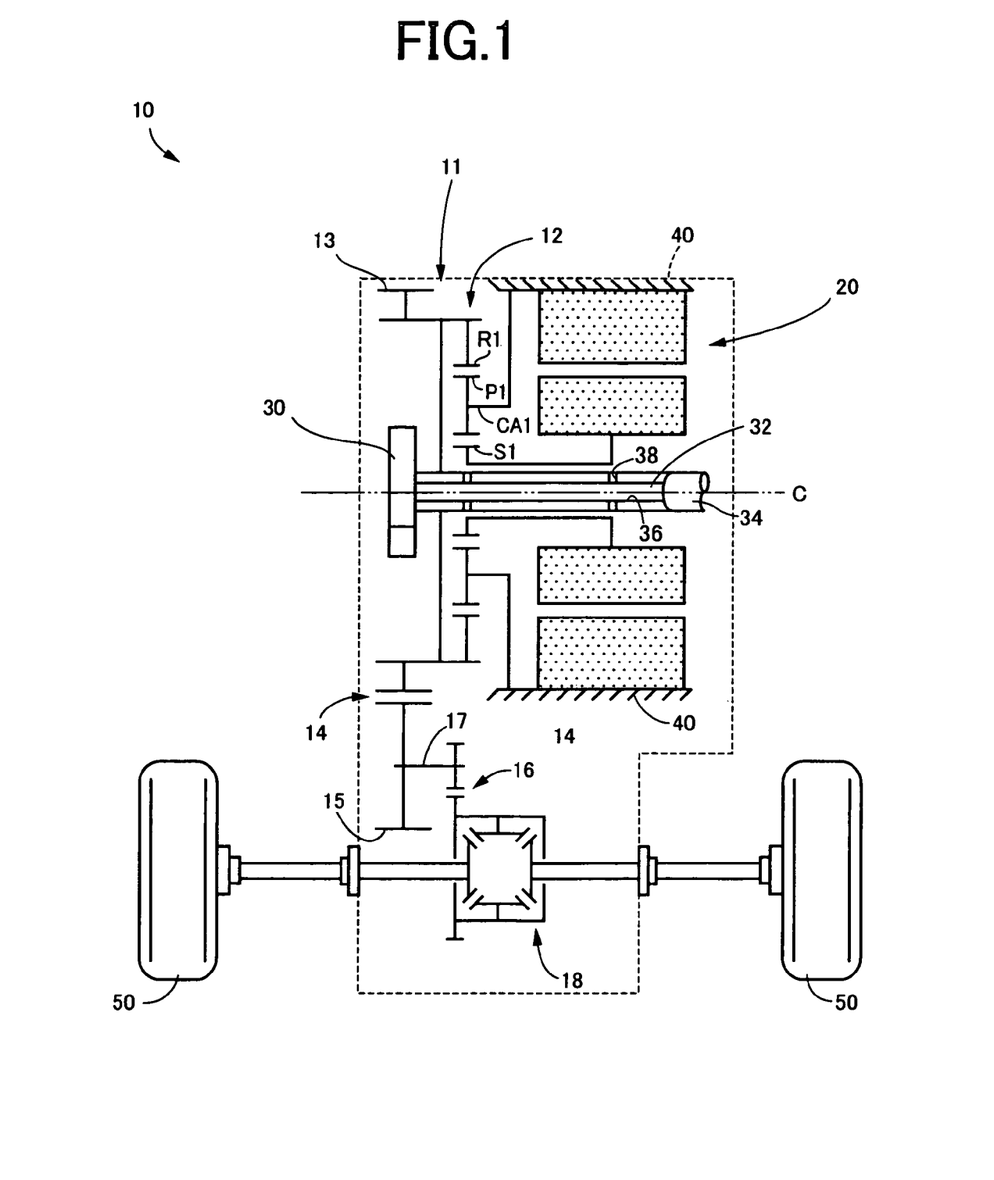
FIG. 1 is a schematic configuration diagram explaining a power transmitting device according to the present invention.

Hereinafter, the embodiments of the invention are described in detail with reference to the drawings. FIG. 1 is a schematic configuration diagram explaining a power transmitting device 10 according to the present invention. In FIG. 1, in a transaxle (T/A) case 40 that serves as a non-rotary member attached to the body (hereinafter referred to as "a case 40") are provided a power transmitting device 10, an electric motor 20 that is a driving motor serving as a power source for driving, an oil pump 30, and the like.

The power transmitting device 10 mainly is composed of a planetary gear unit 12, a counter gear pair 14, a final gear pair 16, and a differential gear unit (final reduction mechanism) 18. The power transmitting device 10 is a power transmitting device for an electric vehicle, which transmits power of the electric motor 20 to the driving wheel 50 side successively through the planetary gear unit 12, the counter gear pair 14, the final gear pair 16, and the differential gear unit (final reduction mechanism) 18, and the like.

The planetary gear unit 12 comprises, as three rotational components, a sun gear S1, a ring gear R1 positioned coaxial with the sun gear S1, and a carrier CAM that rotatably and revolvably supports a pinion gear P1 that engages with the sun gear S1 and the ring gear R1. The planetary gear unit 12 is a publicly known single-pinion planetary gear mechanism that produces differential effects.

In the planetary gear unit 12, the sun gear S1 has connected thereto the electric motor 20, the carrier CA1 is non-rotatably fixed to the case 40, and the ring gear R1 has connected thereto an output gear 13 that forms one gear of the counter gear pair 14 and also has connected thereto the oil pump 30. The ring gear R1 and the output gear 13 are composed of an integral rotary member 11 i.e., integrally rotating member in which the output gear 13 is integrally mounted on the outer periphery of the ring gear R1. That is, the integral rotary member 11 is a cylindrical member equipped with an outer tooth (i.e., output gear 13) that engages with a driven gear 15 of a counter shaft 17 to output a power to driving wheels, and functions as an output rotary member.

The electric motor 20 may be a synchronous motor, for example. The electric motor 20 at least has a function as a motor that generates driving torque, and is positioned on the same axis C as the planetary gear unit 12. This electric motor 20 is connected to an electrical storage device, such as a battery, a condenser, or the like, through a non-illustrated inverter, for example. When the inverter is controlled by an electrical control unit for motor control mainly composing of a microcomputer (not illustrated), the output torque is adjusted or set. The motor may also be constituted to function as a generator. In such a case, the regeneration torque is adjusted or set by the above-mentioned microcomputer.

The oil pump 30 is positioned on the same or common axis C as the planetary gear unit 12. The oil pump 30 is placed on the inner periphery side of the above-mentioned integral rotary member 11 (i.e., the ring gear R1 and the output gear 13) so that at least a part of the structural element of the oil pump 30 is in the same position in the direction of the axis C, and is arranged to overlap with the integral rotary member 11 in the direction perpendicular to the axis C. That is, with disposing the oil pump 30 on the same axis C as the planetary gear unit 12, the oil pump 30 is nested in the ring gear R1.

The oil pump 30 is rotated together with the ring gear R1 by the electric motor 20 through the planetary gear unit 12, and splashes an oil centrifugally from the rotational center (axis C side) of the planetary gear unit 12 to lubricate it. Further, the oil pump 30 also pumps up, from a non-illustrated oil pool, a lubricating oil to be circulated from the rotational center (axis C side) of the electric motor 20 to cool it or lubricate a non-illustrated ball bearing, etc., and feeds (ejects) the oil through an oil-path 32. When the lubricating oil in the oil pool is scraped up by the final gear pair 16, in order to reduce losses due to stirring and increase the efficiency, the lubricating oil may be pumped up by the oil pump 30 to a non-illustrated catch tank to lower the oil level in the oil pool.

The oil-path 32 comprises, for example, a hollow opening 36 that is formed along the axis C from the oil pump 30 in the shaft 34 connected to the oil pump 30 and a eject opening 38 that communicates with the hollow opening 36 and is formed toward the outer periphery side.

Figure 2:
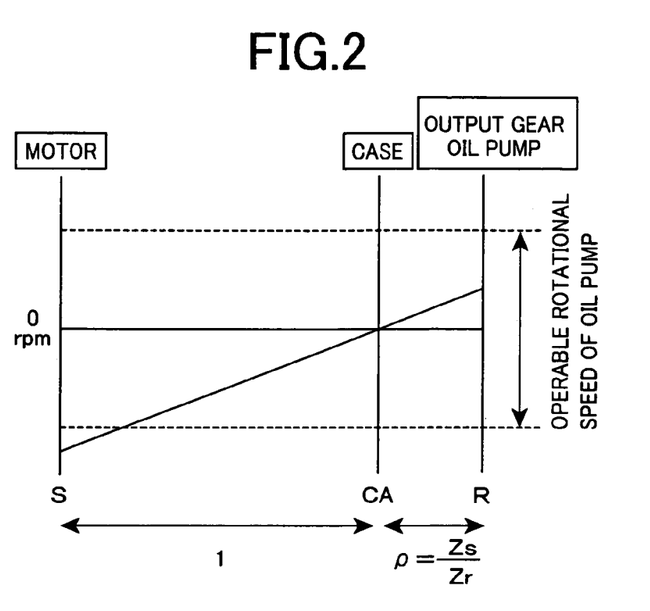
FIG. 2 is a collinear diagram showing the relative relation in rotational speed among the rotational components of a single-pinion planetary gear unit that functions as a reduction mechanism.

FIG. 2 is a collinear diagram showing the relative relation in rotational speed among the rotational components of the single-pinion planetary gear unit 12. In the collinear diagram, the ordinate S, the ordinate CA, and the ordinate R are axes that express the rotational speed of the sun gear S1 connected to the electric motor 20, the rotational speed of the carrier CA1 connected to the case 40, and the rotational speed of the ring gear R1 connected to the output gear 13 and the oil pump 30, respectively.

Defining the interval between the ordinate S and the ordinate CA as 1, the intervals among the ordinate S, the ordinate CA, and the ordinate R are set so that the interval between the ordinate CA and the ordinate R is ρ (=number of teeth Zs of the sun gear S1/number of teeth Zr of the ring gear R1). The ρ being less than one (1) shows that the planetary gear unit 12 functions as a single-pinion planetary reduction mechanism that reduces the rotational speed of the electric motor 20 and transmits the rotation to the ring gear R1 (output gear 13). Accordingly, the oil pump 30 can be slowed down from the electric motor 20, and thus the operating rotational speed of the oil pump 30 can be suppressed.

In order to rotate the oil pump 30 within the usable rotational speed range indicated by the dashed line in FIG. 2, a possible solution is to suppress the maximum rotational speed of the electric motor 20 according to the ρ, or to set the ρ according to the maximum rotational speed of the electric motor 20. For example, when downsizing of the electric motor 20, i.e., an increase in the maximum rotational speed of the electric motor 20, is desired, the ρ may be reduced to suppress the rotational speed of the oil pump 30. However, ρ should be set within the range where the diameter of the sun gear S1 does not become too small while the diameter of the ring gear R1 does not become too large.

Figure 3:
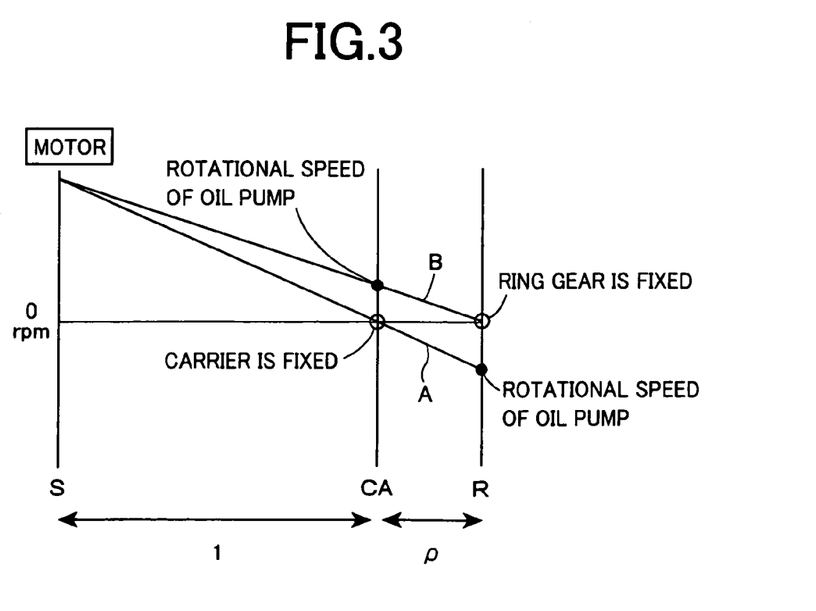
FIG. 3 is a figure explaining the difference in ρ between a carrier-fixed structure and a ring-gear-fixed structure in a single-pinion planetary gear unit.

FIG. 3 is an explanatory view explaining the difference in ρ between a carrier-fixed structure and a ring-gear-fixed structure in a single-pinion planetary gear unit. In FIG. 3, the solid line "A" indicates the case of carrier-fixed structure in which a carrier is non-rotatably fixed, which corresponds to the planetary gear unit 12 of the present embodiment. The solid line B indicates the case of ring-gear-fixed structure in which a ring gear is non-rotatably fixed, which corresponds to the conventional planet gear portion 1 shown in FIG. 6.

Hereinafter, supposing that an oil pump 30 where the limit of the usable rotational speed is about 6000 rpm and an electric motor 20 whose maximum rotational speed (allowable rotational speed) is about 20000 rpm are used, ρ values set in these cases are calculated for a carrier-fixed structure and a ring-gear-fixed structure, respectively.

When the carrier is fixed, since the relation of "the rotational speed of an oil pump=ρ×the rotational speed of a motor" is satisfied, ρ is thus about 0.3. Meanwhile, when a ring gear is fixed, the relation of "the rotational speed of an oil pump=ρ/(1+ρ)×the rotational speed of a motor" is satisfied, ρ is thus about 0.43.

In this way, the ring-gear-fixed structure allows the rotational speed of the oil pump 30 to be suppressed (in other words, ρ can be relatively large) even upon relatively large value ρ, which is more advantageous in design. However, even in the carrier-fixed structure, the value ρ is about 0.3. Even considering the diameter of the sun gear S1 or the diameter of the ring gear R1, this value is sufficiently acceptable. Accordingly, the necessity of employing a ring-gear-fixed structure in order to downsize the electric motor 20 or suppress the rotational speed of the oil pump 30 will be extremely low.

Figure 4:
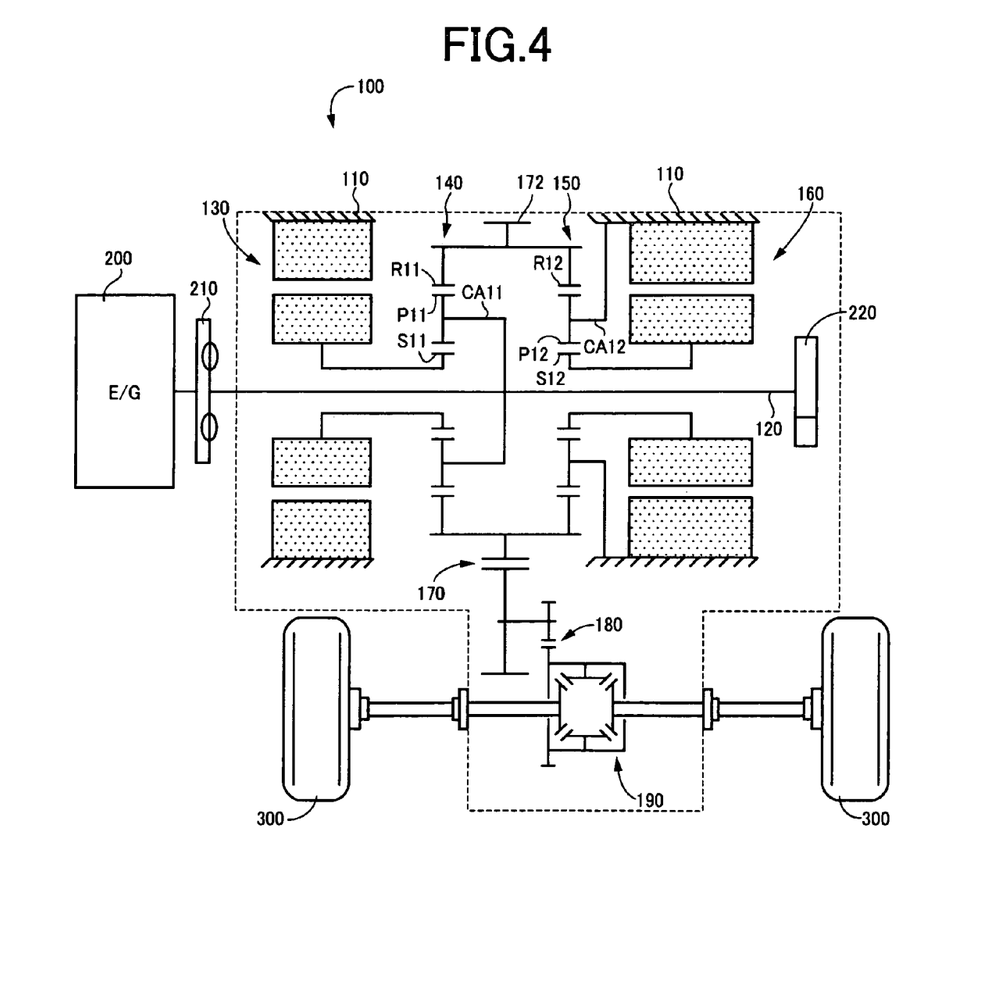
FIG. 4 is a figure showing the framework of a drive unit for a hybrid vehicle.

FIG. 4 is a figure showing the framework of a drive unit 100 for a hybrid vehicle. In FIG. 4, the drive unit 100 comprises, as a driving power source for driving, an engine 200 that is a combustion engine such as a gasoline engine or a diesel engine. The drive unit 100 further comprises, in a case 110 that serves as a non-rotary member attached to the body, from side of the engine 200, a damper 210, an input shaft 120, a first motor 130, a first planetary gear unit 140 that functions as a power distribution mechanism, a second planetary gear unit 150 that functions as a reduction mechanism, and a second motor 160, in this order. The damper 210 is operatively connected to the output shaft (for example, crankshaft) of the engine 200, and absorbs the pulsation due to the torque variation from the engine 200, etc. The input shaft 120 is rotated through such a damper 210 by the engine 200.

The drive unit 100 is preferably applied to FF (front engine/front drive) vehicles to be transversely mounted, for example. The power of the engine 200 is transmitted to a pair of driving wheels 300 from the output gear 172 that serves as an output rotary member of the drive unit 100 that forms one gear of the counter gear pair 170 sequentially through the counter gear pair 170, the final gear pair 180, and the differential gear unit (final reduction mechanism) 190, etc.

The input shaft 120 is connected, at one end thereof, to the engine 200 through the damper 210 to be rotated by the engine 200. The other end is connected to the oil pump 220 as a lubricating oil supplying device. When the input shaft 120 is rotated, the oil pump 220 is accordingly rotated, whereby a lubricating oil is fed to each of the components of the drive unit 100, for example, the first planetary gear unit 140, the second planetary gear unit 150, a non-illustrated ball bearing, etc.

The first planetary gear unit 140, which is a single-pinion planetary gear unit, includes, as rotational components (components), a first sun gear S11, a first pinion gear P11, a first carrier CA11 that rotatably and revolvably supports the first pinion gear P11, and a first ring gear R11 that engages with the first sun gear S11 through the first pinion gear P11.

The first planetary gear unit 140 is a mechanism that mechanically distributes the output of the engine 200 that has been transmitted to the input shaft 120, and distributes the output of the engine 200 to the first motor 130 and the output gear 172. That is, in the first planetary gear unit 140, the first carrier CA11 is connected to the input shaft 120, i.e., the engine 200, the first sun gear S11 is connected to the first motor 130, and the first ring gear R11 is connected to the output gear 172. As a result, the first sun gear S11, the first carrier CA11, and the first ring gear R11 are allowed to relatively rotate. Accordingly, the output power i.e., output force of the engine 200 is distributed to the first motor 130 and the output gear 172.

Moreover, the output power of the engine 200 distributed to the first motor 130 causes the first motor 130 to generate electricity, and such generated electrical energy is stored, or used to rotate the second motor 160. Accordingly, the drive unit 100 is brought in an infinitely variable i.e., a continuously variable condition (electrically controlled CVT condition), for example, and functions as an electric continuously variable transmission in which the rotation of the output gear 172 is continuously changed regardless of the predetermined rotation of the engine 200.

The second planetary gear unit 150, which is a single-pinion planetary gear unit, includes, as rotational components, a second sun gear S12, a second pinion gear P12, a second carrier CA12 that rotatably and revolvably supports the second pinion gear P12, and a second ring gear R12 that engages with the second sun gear S12 through the second pinion gear P12. The ring gear R11 of the first planetary gear unit 140 and the ring gear R12 of the second planetary gear unit 150 serve as an integrated composite gear, on an outer periphery of which the output gear 172 is mounted.

In the second planetary gear unit 150, the second carrier CA12 is connected to the case 110 that is a non-rotary member to be prevented from rotating. The second sun gear S12 is connected to a second motor 160, and the second ring gear R12 is connected to the output gear 172. Accordingly, for example, at the time of start, etc., the second motor 160 is driven to rotate the second sun gear S12. The rotational speed is reduced by the second planetary gear unit 150, and the rotation is transmitted to the output gear 172.

The first motor 130 and the second motor 160 are so-called motor generators with electricity generating function. The first motor 130 is at least provided with generator (electricity generation) function for generating a reaction force, and the second motor 160 is at least provided with motor function as the driving power source for outputting driving power.

The power transmitting device 10 of FIG. 1 and the drive unit 100 of FIG. 4 are compared with each other. Then, the component of the portions related to the counter gear pairs 14 and 170, the final gear pairs 16 and 180, and the differential gear units (final reduction mechanisms) 18 and 190 can be mutually applied (commonality). In addition, the components of the portions related to the planetary gear unit 12 and the second planetary gear unit 150, and the portions related to the electric motor 20 and the second motor 160 can be mutually applied (commonality) between both apparatuses. Accordingly, inexpensive components can be used in each of the power transmitting device 10 and the drive unit 100, which can reduce the cost for the whole power train unit, for example.

Figure 5:
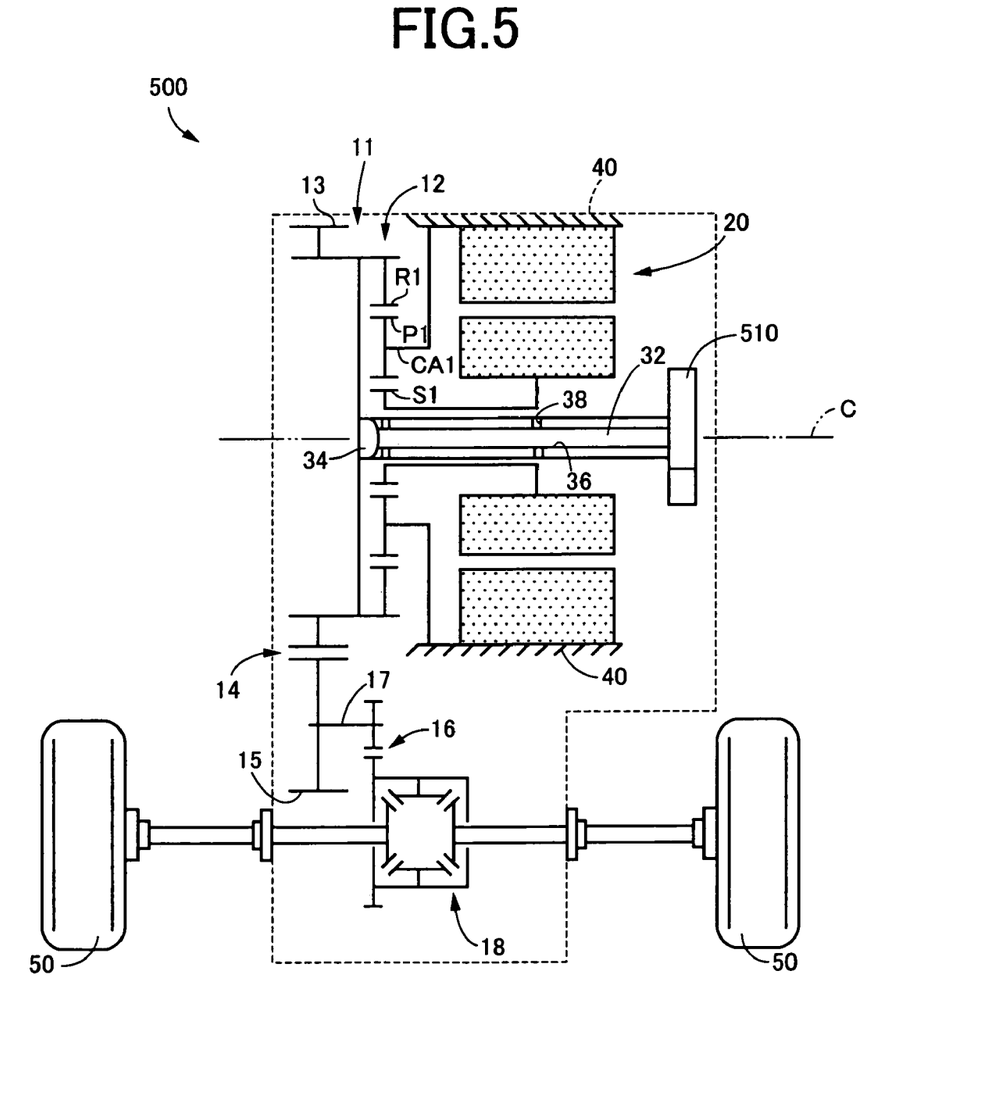
FIG. 5 is a schematic configuration diagram explaining a power transmitting device according to the present invention, which is another example of the power transmitting device shown in FIG. 1.

FIG. 5 is a schematic configuration diagram explaining a power transmitting device 500 to which the present invention is applied, and which is another example of the power transmitting device 10 shown in FIG. 1. In the following explanation of the power transmitting device 500, the portions common with the power transmitting device 10 are indicated with the same numerals, and explanations thereof are omitted.

In FIG. 5, on the same axis C as the planetary gear unit 12, an oil pump 510 is not nested in the ring gear R1. Instead, the oil pump 510 is, with connected to the ring gear R1, positioned on the electric motor 20 side relative to the planetary gear 12 so as to lie next to the electric motor 20. Accordingly, likewise the oil pump 30, the oil pump 510 is rotated by the electric motor 20 together with the ring gear R1 through the planetary gear unit 12, to thereby feed a lubricating oil to the planetary gear unit 12 or the electric motor 20.

Thus, the power transmitting device 500 in which the oil pump 510 is not nested in the ring gear R1, is long in the total length in the direction of the axis C, as compared with the power transmitting device 10. However, in the case where the components are mutually applied (commonality) between the power transmitting device 500 and the drive unit 100, as compared with the case where the components are mutually applied (commonality) between the power transmitting device 10 and the drive unit 100, further commonality of components including the oil pump 510 is achieved. That is, although the power transmitting device 500 is disadvantageous in downsizing as compared with the power transmitting device 10, it is advantageous in reducing the cost.

According to the above embodiments, the following advantages are rendered. First, in the planetary gear unit 12 of the power transmitting devices 10 and 500, the sun gear S1 is connected to the electric motor 20, the carrier CA1 is non-rotatably fixed to the case 40, and the ring gear R1 is connected to the output gear 13 and the oil pumps 30 and 510. As a result, the structure of carrier being fixed/output being taken out from ring gear is obtained.

Further, since the rotational speed of the electric motor 20 is transmitted with reduction to the output gear 13, for example, the structure can be employed in which the ring gear R1 and the output gear 13 are integrated. Accordingly, as compared with a structure of ring gear being fixed/output being taken out from carrier in which the output gear has to be axially offset and connected to the carrier, the axial space can be omitted, which can downsize the power transmitting devices 10 and 500.

Thus, with saving the axial space, the vehicle power transmitting device that can be downsized axially is provided. Further, since the rotational speed of the oil pumps 30 and 510 connected to the output side is reduced relative to the rotational speed of the electric motor 20 of the input side, the operating rotational speed of the oil pumps 30 and 510 can be suppressed, which can increase the durability of the oil pumps 30 and 510.

Secondly, since the oil pump 30 is disposed coaxial with the planetary gear unit 12, at least the part of the structural element of the oil pump 30 is placed on the inner periphery side of the integral rotary member 11 in which the ring gear R1 and the output gear 13 are integrally mounted. Accordingly, the total length of the power transmitting device 10 itself is further reduced. Thus, since the oil pump 30 is nested in the ring gear R1, the space saving is achieved axially in the power transmitting device 10.

Thirdly, the integral rotary member 11 is the cylindrical member equipped with an outer tooth (i.e., output gear 13) that engages with the driven gear 15 to output the power to the driving wheels 50, and functions as the output rotary member. Therefore, the axial dimension of the power transmitting devices 10 and 500 in the axial direction can be reliably reduced.

Fourthly, the oil-path 32 is provided along the axis C from the oil pumps 30 and 510 that is positioned coaxial with the planetary gear unit 12, for ejecting the lubricating oil for lubricating the planetary gear unit 12 from the rotational center thereof. Accordingly, the oil can be centrifugally splashed from the rotational center of the planetary gear unit 12 to appropriately lubricate (cool) the planetary gear unit 12, which provides the advantage in preventing burning of the planetary gear unit 12. Further, the length of the oil-path 32 can be advantageously reduced.

Fifthly, the electric motor 20 is disposed on the same axis C as the planetary gear unit 12 together with the oil pumps 30 and 510, and the oil-path 32 ejects the lubricating oil for cooling the electric motor 20 from the rotational center of the electric motor 20. Accordingly, the oil can be circulated for cooling from the axis side of the electric motor 20, which provides the advantage in cooling the electric motor 20. Further, the length of the oil-path 32 can be advantageously reduced. Further, since the planetary gear unit 12 reduces the rotational speed of the oil pumps 30 and 510 relative to the rotational speed of the electric motor 20, the maximum rotational speed of the electric motor 20 can be increased, which contributes to the downsizing thereof.

Sixthly, since the power transmitting devices 10 and 500 are power transmitting devices for the electric vehicle where the power source is the electric motor 20, the electric vehicle whose power source is the electric motor 20 can be appropriately constituted.

Seventhly, since components can be mutually applied (commonality) between the power transmitting devices 10 and 500 and the driving unit 100 for hybrid vehicles, inexpensive components can be used, which can reduce the cost for the whole power train unit.

Although one embodiments of the present invention is explained in detail based on the drawings. However, the present invention is also applicable to other embodiments. For example, the power source is not limited to the electric motor 20 as in the above embodiment. The invention may also be applied to, in addition to the electric motor 20, any of other internal combustion engines such as a gasoline engine, a diesel engine, and the like.

Further, the planetary gear unit 12 is not limited to the single-pinion planetary gear mechanism as in the above embodiments, and may also be, for example, a double-pinion planetary gear mechanism that functions as the planetary reduction mechanism. Also when using the double-pinion planetary gear mechanism, the power source is connected to the sun gear and the oil pump is connected to the ring gear, so that a structure of carrier being fixed/output power being taken out from ring gear can be rendered.

The above mentioned is just one embodiment of the invention, and various modifications and improvements are possible based on the knowledge of skilled person in the art.

What is claimed is:

1. A vehicle power transmitting device for transmitting power from a power source through a planetary gear unit to an output side, the planetary gear unit comprising a sun gear that is connected to the power source, a carrier that is non-rotatably fixed, and a ring gear that is directly connected to an output rotary member, and serving as a reduction mechanism that, with reducing a rotational speed of the power source, transmits a rotation to the output rotary member, wherein an oil pump is directly connected to the ring gear, and the oil pump is positioned coaxial with the planetary gear unit and at least a part of a structural element of the oil pump is placed on an inner periphery side of an integral rotary member that rotates integrally with the ring gear.

2. A vehicle power transmitting device according to claim 1, wherein the integral rotary member is a cylindrical member equipped with an outer tooth that engages with a driven gear of a counter axis to output a power to driving wheels, for functioning as the output rotary member.

3. A vehicle power transmitting device according to claim 1, further comprising an oil-path that is provided along the axis from the oil pump for ejecting a lubricating oil for lubricating the planetary gear unit, from a rotational center of the planetary gear unit.

4. A vehicle power transmitting device according to claim 3, wherein the power source is an electric motor positioned coaxial with the planetary gear unit together with the oil pump, and the oil-path ejects a lubricating oil for cooling the electric motor, from the rotational center of the electric motor.

5. A vehicle power transmitting device according to claim 1, wherein the vehicle power transmitting device is a power transmitting device for an electric vehicle whose power source is an electric motor.

* * * * *